United States Patent [19]

Nikora

[11] Patent Number: 4,516,777
[45] Date of Patent: May 14, 1985

[54] MOBILE SELF-CONTAINED VIDEO GAME SYSTEM WITH INSTANTANEOUSLY SELECTABLE GAME CARTRIDGES

[76] Inventor: Robert J. Nikora, 6690 Windmill La., Union Lake, Mich. 48085

[21] Appl. No.: 553,540

[22] Filed: Nov. 21, 1983

[51] Int. Cl.³ .......................... A63F 9/22; H05K 5/00; A47F 81/06
[52] U.S. Cl. ........................ 273/148 B; 273/DIG. 28; 312/7.2
[58] Field of Search ................... 273/148 B, DIG. 28; 312/250, 7.2

[56] References Cited

U.S. PATENT DOCUMENTS 4,095,791  6/1978  Smith et al. ..................... 273/856
4,245,871  1/1981  Rex ..................................... 312/223

FOREIGN PATENT DOCUMENTS 3013751  10/1981  Fed. Rep. of Germany ... 273/121 A

OTHER PUBLICATIONS

Western Electric Technical Digest No. 63, p. 25, 7-1981.

Primary Examiner—Richard C. Pinkham
Assistant Examiner—Scott Brown
Attorney, Agent, or Firm—Krass and Young

[57] ABSTRACT

A mobile self-contained video gaming system. The system internally stores a plurality of standard video game cartridges simultaneously and provides instantaneous external user selection of any game cartridge without power sequencing of the console electronics or physical extraction/insertion of the cartridges. The system includes a video monitor for viewing either color or monochrome game images, a video game console electronics unit, a cartridge storage and switching apparatus, a plurality of video game cartridges, multiple hand-held game controllers for providing player control inputs to the console electronics, audio separator and amplification circuits, a choice of speaker or earphone audio devices, an externally activated and lockable power switch, an audio device selector to disable conventional speaker use in "quiet" environments. The system is enclosed in a mobile housing which includes a height adjustment mechanism and a power cord take-up apparatus.

5 Claims, 6 Drawing Figures

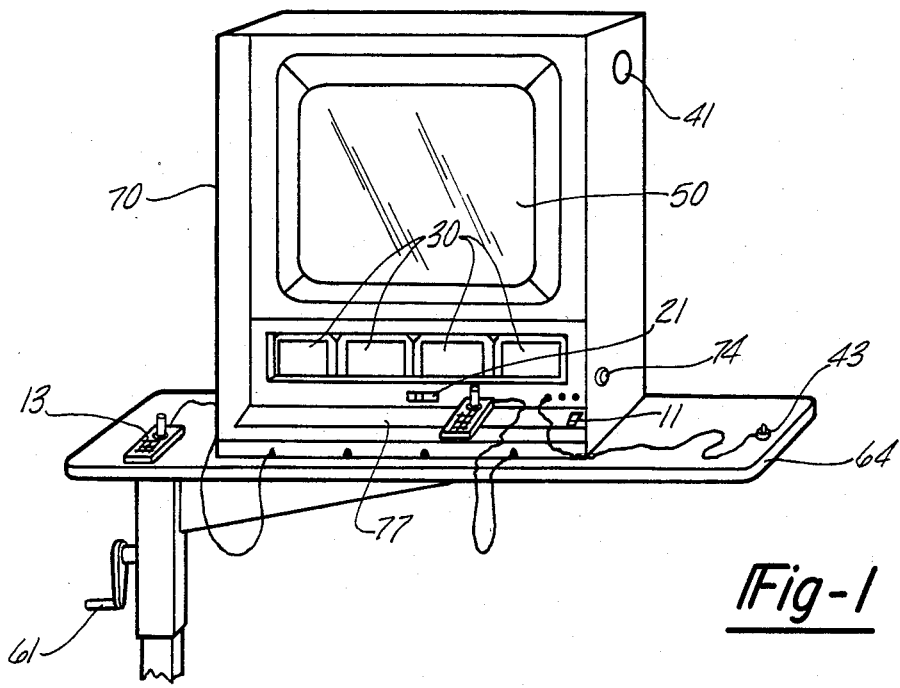
Fig-1
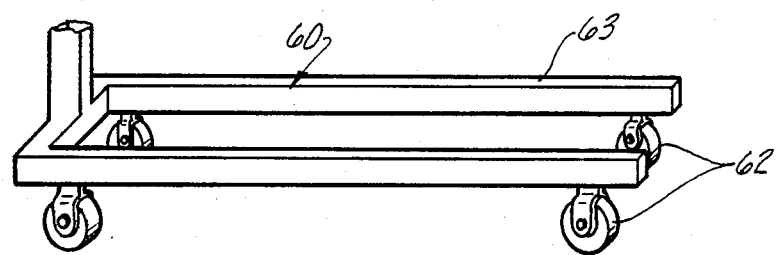
Fig-3
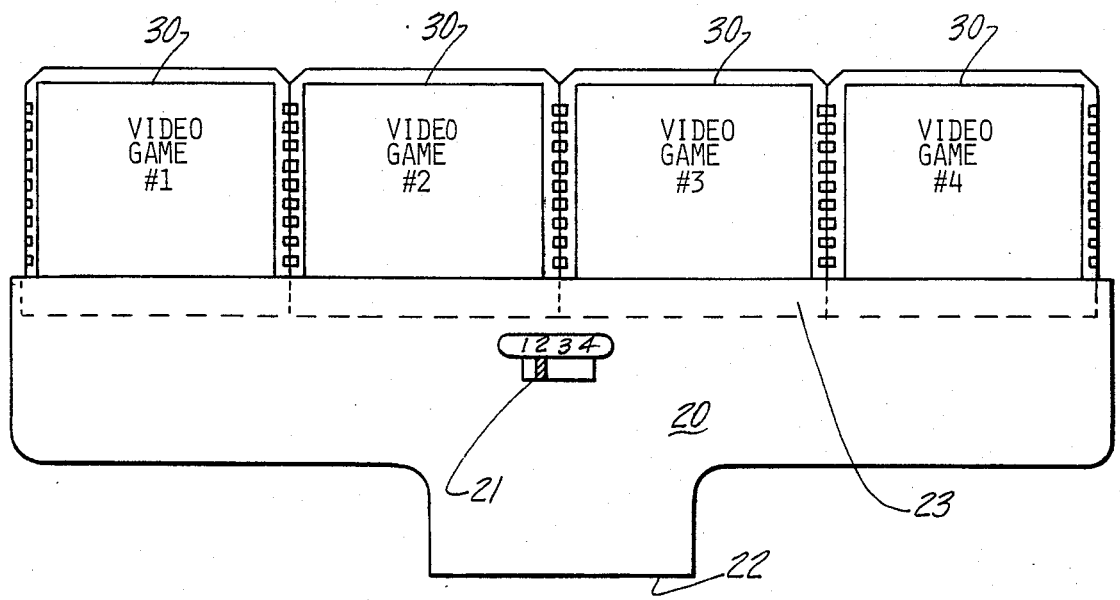

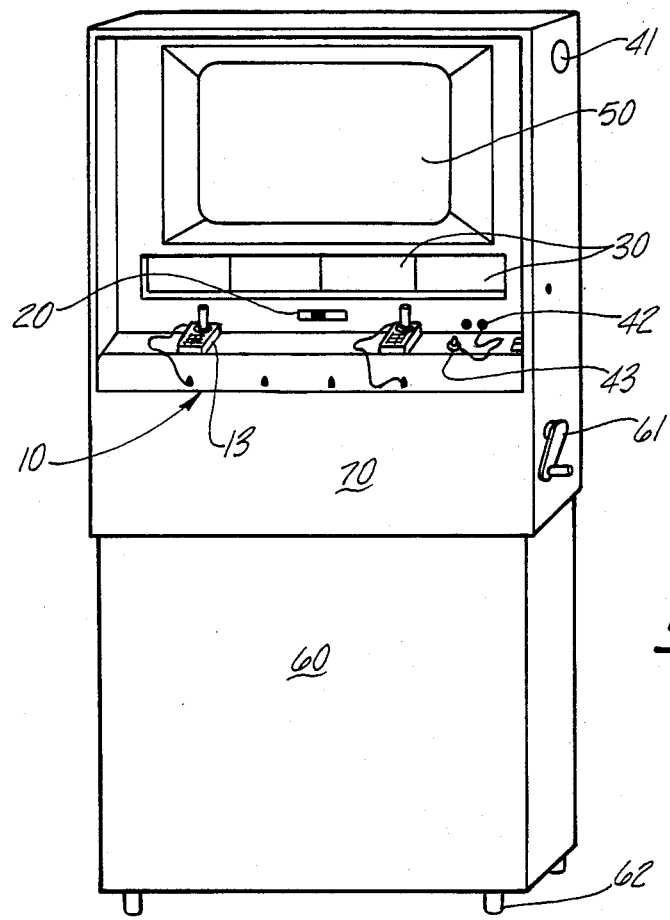
_Fig-5_
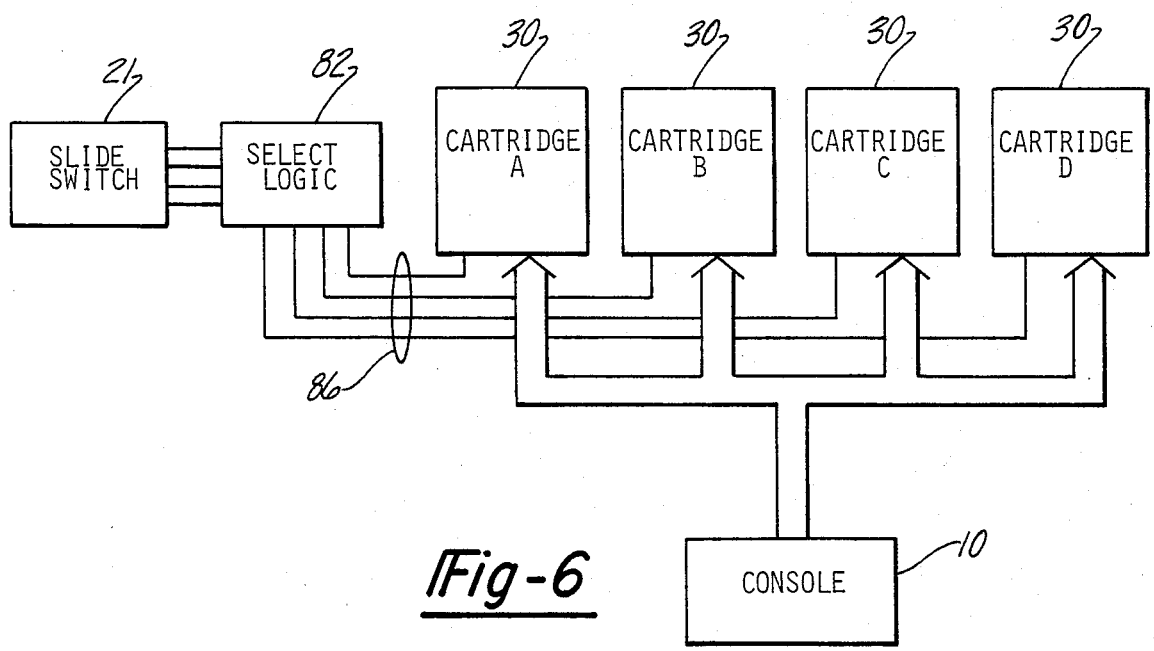
_Fig-6_

MOBILE SELF-CONTAINED VIDEO GAME SYSTEM WITH INSTANTANEOUSLY SELECTABLE GAME CARTRIDGES

BACKGROUND OF THE INVENTION

1. Field of the Invention

The present invention relates generally to video game systems, and more particularly, to a mobile, adjustable, self-contained system including a plurality of on-line video games that may be selected instantaneously.

2. Description of the Prior Art

Self-contained coin-operated commercial video game systems and component home electronic video game systems are well known in the game art. Typically, commercial video game systems limit a user to a single game selection on a particular machine. The associated audio portion of the game is publically transmitted to the surrounding area and may not be controlled by the user. The playing position of a person using the commercial system is predetermined by the design of the game housing and offers no provision for height adjustment or remote, hand-held game input controllers. Additionally, these systems are heavy, large in size, and are housed in enclosures that are rarely equipped with casters and do not lend themselves to mobility or confined space environments.

Component home video game systems consist of many separate and often fragile components connected together by numerous cumbersome and potentially hazardous wires, cables, and cords. These systems usually require the user to provide a standard black and white or color television set and to perform the cabling, T.V. adjustments, and installation. Due to their component nature, home video game systems are difficult and often impractical to move from location to location, offer limited commercial durability, and provide no theft protection in a commercial or institutional setting.

Although a plurality of game cartridges are available for the component home systems, they are traditionally stored separately in an "off-line" fashion. This requires the user, at minimum, to select and locate a desired game cartridge, remove the present game cartridge from the console electronics, insert the desired game cartridge in the console electronics, and store the old cartridge where it can be found later. This process may further be complicated by a manufacturers recommendation that the console electronics be turned off during the game cartridge extraction/insertion procedure and turned back on when the procedure is completed. In addition, the physical storage and handling required with the cartridges of the home systems is inconvenient and impractical in a commercial, institutional, or handicapped environment.

Finally, since component home video game systems typically rely upon speakers built into user provided standard black and white or color televisions for audio output, there is rarely a provision for personalized listening via headphone or earphone devices.

SUMMARY OF THE INVENTION

The present invention includes a basic console unit and a specialized mobile base unit. The basic console unit includes video game console electronics with its associated power supply and power adapter, and a video game cartridge magazine for storage and selection of a plurality of standard video game cartridges. A video monitor and audio separator with adjustable sound amplication circuitry are connected to the outputs of the console.

A switch is provided to selectively switch the audio output between a conventional speaker, an earphone jack into which a disposable earphone may be inserted, and an off position. The system is provided with hand held game controllers which are connected to input ports on the game console. The entire system is enclosed within a tamperproof housing mounted on a mobile base unit designed to be used in specialized environments. The housing includes a game cartridge viewing window to aid in selecting and using the game cartridges. To prevent unauthorized access to the system, the power switch is key operated.

A primary object of the present invention is to provide a completely self-contained video gaming system suitable for use in commercial, institutional, handicapped, or other specialized applications including hotels, motels, hospitals, nursing homes, prisons, and home use by handicapped patients, among others.

Another object of the invention is to provide a plurality of internally contained on-line games that can be instantaneously user selected with minimal effort. The game selection can be changed periodically to provide a virtually unlimited choice of games.

A further object of the present invention is to provide lockable switch circuits and apparatus to offer personalized audio listening for practical use in "quiet" environments.

Yet another object of the present invention is to provide a secure housing and mobil base adaptable for use in specialized operating conditions including applications requiring mobility and environments where space is a consideration. These and other objects of the present invention will become apparent from the following detailed description.

BRIEF DESCRIPTION OF THE DRAWINGS

FIG. 1 is a perspective view of the basic console unit with game controller, earphone, and a base adapted for use in a hospital environment.

FIG. 3 is a pictorial view of the preferred embodiment of the game cartridge magazine with game cartridges installed.

FIG. 5 is a perspective view of the basic console unit with game controllers, earphone, and a base for use in a commercial setting.

FIG. 6 is a block diagram of the game cartridge magazine of FIG. 3.

DETAILED DESCRIPTION OF THE PREFERRED EMBODIMENT

Figure 2:
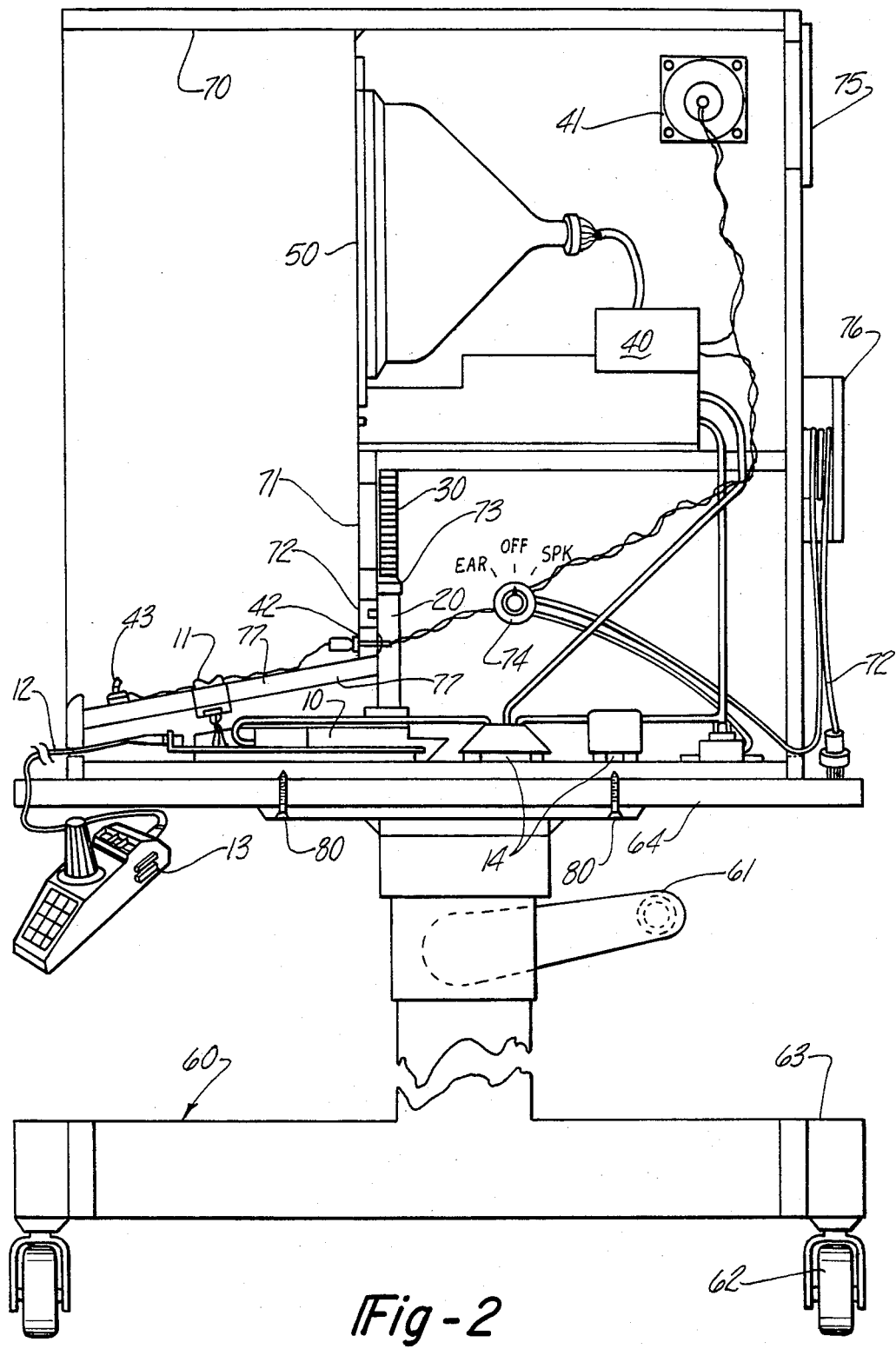
FIG. 2 is a cross-sectional view of the system of FIG. 1.

Referring to FIGS. 1 and 2, there is disclosed an embodiment of a video game system in accordance with the present invention. The video game system comprises video game console electronics 10 (FIG. 2) such as the type known as the Atari 5200 and available commercially from Atari Corporation. The video game console includes a power supply and adapter unit 14 (FIG. 2), and a video game cartridge magazine 20 (FIG. 2), adapted to hold a plurality of video game cartridges 30. In use, as shown, the magazine 20 is inserted into the cartridge slot of the game console 10.

The game console 10, as is well known, generates video and audio output signals to provide visual and audio representations of the game play to the user. These video signals are connected to the video inputs of a black and white or color monitor 50, such as ZVM-131 available from Zenith Data Systems. The video signals produce game images on the monitor which are viewed by the user. An audio separator and amplifier 40 (FIG. 2) receives the audio output from the game console and translates the audio output into appropriate audio signals to drive a speaker 41 or an earphone 43. The audio circuitry 40 and speaker 41 are typically integral components of the video monitor 50. The entire system, including the game console 10, the cartridge magazine 20, the power supply and adaptor 14, and the monitor 50 and audio circuitry 40, is enclosed within housing 70 and is mounted using screws 80 (FIG. 2) to a mobile base unit 60.

Power is supplied to the game console 10, the monitor 50 and the audio separator and amplifier 40 by a power cord 72. Delivery of power to the game console 10, monitor 50 and amplifier 40 is controlled by key switch 74. With the switch in the OFF position, no power is delivered to the system. By turning the key switch 74 to either the EAR or SPK position, the video game system is activated and placed in a standby mode. In this mode, the monitor 50 and audio amplifier 40 are activated, but the game console 10 remains inoperative. The game console 10 is activated by depression of power switch 11. In the active state, the game console 10 delivers appropriate video and audio signals to the monitor 50 and the audio amplifier 40 as determined by a selected one of the game cartridges 30 in magazine 20.

Referring now to FIGS. 3 and 6, the cartridge magazine 20 provides storage and electrical connections to a plurality of standard game cartridges 30. The connector end 22 of magazine 20 is adapted to plug into the cartridge slot of the game console 10 and provides the necessary electrical contacts between a selected game cartridge 30 and the console 10.

The cartridge magazine 20 functionally consists of three sections; the receptacle section 23, the switch section 21, and the connector section 22. The receptacle section 23 includes multiple game cartridge case adapter sleeves and edge card connector receptacles. The case adapter sleeves provide for the physical mating of game cartridges to the cartridge magazine in such a manner as to provide game cartridge opening, vertical and horizontal support, and an unobstructed view of the cartridge's game picture and name.

The multiple edge card connector receptacles provide the proper electrical connection between the game cartridge and the cartridge magazines switch section. The switch section 21 is made up of a printed circuit board that routes and interconnects the electrical signals between the edge card connector receptacles, the switch circuit, and the connector assembly. A single detented switch assembly and its associated circuit provides signal switch selection of any game cartridge that is installed in the receptacle section. The connector section 22 is physically and electrically compatible with the game cartridges and provides the interface between the game cartridge 30 selected by the switch section and the console electronics unit 10.

In operation, slide switch 21 provides an electrical indication of its position to select logic circuits 82. The select logic circuit 82 provides a signal to activate the power and select leads 86 on the desired cartridge. Since a cartridge is operative only when its power and select leads 86 have been activated, data request signals sent by the console 10, although received by all cartridges, are responded to by only the activated cartridge. Thus, moving the selector switch 21 provides an appropriate communication link between the game console 10 and a single selected cartridge 30.

Use of the magazine 20 provides simultaneous storage of a plurality of game cartridges 30 in an electrically "on-line" manner. This permits instantaneous switching between any one of the installed cartridges without requiring physical access to the cartridges, a desirable feature when the system is used in an institutional or commercial setting.

In addition, because the select logic activates both the power and select leads 86 of the selected cartridges 30, it is unnecessary to power down the game console 10 prior to selecting a new cartridge. Moving the slide switch 21 automatically removes the power from the currently connected cartridge and provides it to the newly selected cartridge. At the same time, the "select" lead on the new cartridge is activated to generate a "reset" signal to the console 10. This signals the console 10 that a new cartridge is select and the console starts playing the new game from the beginning.

The magazine 20 is contained within the housing 70 and is inaccessible to the user. The switch 21, however, projects through an opening 72 (FIG. 2) thus allowing a user to select from a plurality of games without permitting physical access to the game cartridges 30 or the game console electronics unit 10.

Figure 4:
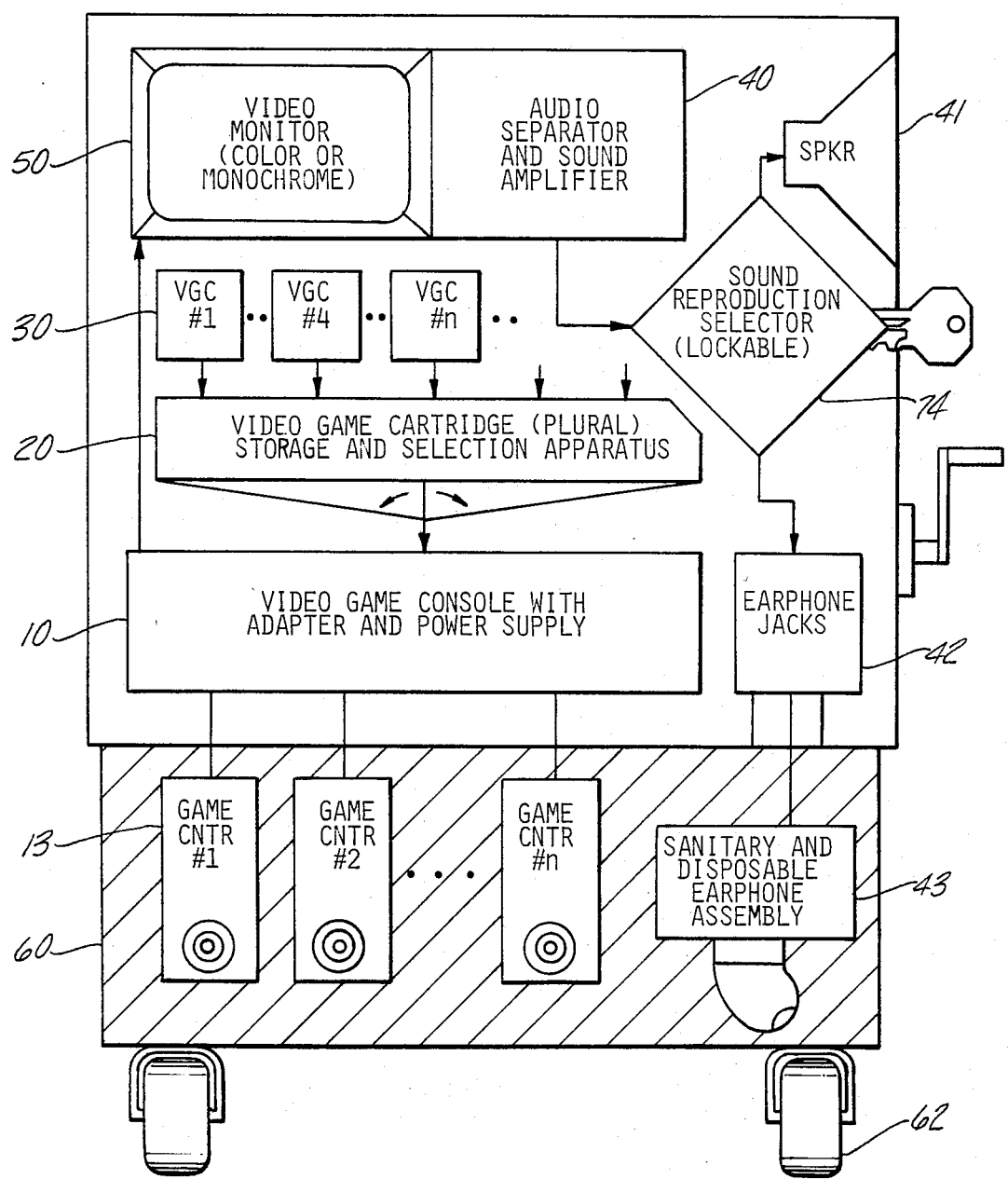
FIG. 4 is a block diagram of the mobile self-contained plural video game system showing a preferred embodiment of the basic console unit and mobile base.

Referring to FIG. 4, the operation of the game system is shown in block diagram form. A plurality of game cartridges 30 are installed in the game cartridge magazine 20. A selected game cartridge 30 is connected through the magazine 20 to the video game console 10. The game console 10 produces composite video signals and audio signals as described earlier. The composite video output of the console electronics unit 10 is applied to the video monitor 50 and the audio separator and sound amplifier circuits 40. The video monitor 50 displays the graphic images produced by the console electronics unit in either monochrome or color depending upon the monitor type. The audio output of the console 10 is delivered to the audio separator and amplifier 40. The output from the audio separator and sound amplifier 40 is routed through the sound reproduction selector switch 74 and, depending upon the position of switch 74, is passed on to the earphone jacks 42 only or to both the loudspeaker 41 and the earphone jacks 42. The earphone assembly 43 is preferably a disposable, low cost device featuring a molded plug, six foot extension, and a sanitized earpiece. The sound reproduction selector 74 is key operated and must be placed in one of it's two positions (earphones or speaker) to enable power to be applied to the console electronics unit 10, the video monitor 50 and the audio separator and sound amplifier 40. This provides a way of ensuring proper usage by a user in a "quiet" environment and forces the system administrator to consider the most appropriate mode for operation.

In the game system, the user is able to control all game operating parameters via hand-held controllers 13, such as the type commercially available with Atari 5200, which are connected through the housing 70 to the game console 10. The typical operating parameters include start game, reset game, pause game, image direction controls, and fire object. Each controller 13 is attached to the game console 10 via a durable four foot cable 12 that allows operation from a reclining position or from a wheelchair.

Referring now to FIGS. 2, 4 and 5 of the drawings, the console unit housing 70 is constructed of heavy duty dense pressed board covered with formica to provide a durable, sanitary, and aesthetically appealing appearance. It includes a recessed monitor face 50 that reduces glare and unwanted reflections, a game cartridge viewing window 71 which allows a user to see the available game cartridges, a selector access slot 72 to enable positive selection of the desired game cartridge utilizing the selector switch on the cartridge magazine 20, an inclined accessory shelf 77 to provide temporary storage of game controllers 13 and earphones 43. An integrated power cord take-up apparatus 76 is provided which includes a self contained twnety-five foot three wire extension cord and plug assembly. Speaker grill louvers 41 and a louvered ventilation duct 75 provide ventilation and permit passage of the audio portion of the game through the enclosure. The game cartridge magazine is supported by support bracket 73. The entire console enclosure forms a sealed module and may include maintenance access plates secured for example by square head screws. This architecture minimizes the possibility of accidental injury to game system users and provides a reasonable degree of theft protection.

FIG. 1 illustrates use of the game system with a mobile base 60 suitable for use in hospital bed environments. The video game system console 70 is secured by screws 80 to an adjustable tray table apparatus 64 adapted to support the system's weight and physical dimensions. Height is adjusted to the desired level by the hand crank assembly 61 while support and mobility are provided by the support struts 63 and caster assemblies 62. Since game accessories can be stored on the inclined accessory shelf 77 the extremities of the tray table 64 may be used for a writing surface or for food and beverage placement.

FIG. 5 illustrates a second embodiment of the mobil base unit 60. The base in this embodiment is fully-enclosed and weighted to ensure stability. The base 60 is of rectangular horizontal cross-section and is slightly smaller than housing 70. This permits the base 60 to be mounted within the bottom housing 70. The height of housing 70 on the base 60 may be adjusted using crank 61. The wheels 62 of the base 60 are preferably spring mounted to provide shock absorption for protection of the electronic components of the system.

It is apparent that the game system described above provides a self-contained video game system which permits instantaneous selection of one of a plurality of commercially available game cartridges. The system is tamper-proof and provides means for a personal audio reception where necessary or desired. The system is mobile and adaptable to institutional, commercial or handicapped environments.

It will be appreciated that numerous variations and modifications may be made in the structure herein described and shown in the accompanying drawings by those skilled in the art within the spirit and scope of the invention as claimed in the following claims.

I claim:

1. A mobile, self-contained video game system comprising:
   a plurality of video game cartridges each containing program instructions for playing a video game;
   a video game console including means to receive a single video game cartridge and means for generating video and audio signals as determined by the program instructions contained on a video game cartridge;
   a cartridge magazine connected to the means for receiving a single video game cartridge for receiving the plurality of video game cartridges and for providing electrical connections between a selected one of the plurality of video game cartridges and the video game console;
   a video display device for displaying the video signals generated by the video game console;
   a housing having an upper portion which encloses and retains the video game console, the cartridge magazine, and the video monitor in predetermined locations within the housing and a lower portion;
   means for selecting one of the plurality of video game cartridges from without the housing;
   video game controllers connected through the housing to the video game console for controlling the operation of the video game console; and,
   a mobile base unit attached to the lower portion of the housing for providing means for transporting the video game system cross floor surfaces.

2. The video game system of claim 1 including means for providing an acoustic reproduction of the audio signals generated by the video game system.

3. The video game system of claim 2 wherein the means for producing an acoustic reproduction includes an earphone.

4. The video game system of claim 3 wherein the means for producing an acoustic reproduction further includes a speaker, and wherein means are provided for selectively activating the earphone alone, or both the earphone and speaker.

5. The video game system of claim 1 wherein the mobile base unit includes means for adjusting the height of the housing.

* * * * *